US005168283A

United States Patent [19]

Hammond et al.

[11] Patent Number: 5,168,283

[45] Date of Patent: Dec. 1, 1992

[54] METHOD AND APPARATUS FOR CHARGED AREA DEVELOPMENT PRINTING WITH HIGH AND LOW RESOLUTION IMAGE BARS

[75] Inventors: Thomas J. Hammond, Penfield; James D. Rees, Pittsford, both of N.Y.

[73] Assignee: Xerox Corporation, Stamford, Conn.

[21] Appl. No.: 664,729

[22] Filed: Mar. 5, 1991

[51] Int. Cl.[5] .................. G01D 15/14; G01D 9/00; H04N 1/29; H04N 1/23

[52] U.S. Cl. .................. 346/1.1; 316/107 R; 316/154; 316/160; 358/300; 358/302

[58] Field of Search .................. 346/107 R, 108, 160, 346/1.1, 154, 160.1; 358/300, 302, 298

[56] References Cited

U.S. PATENT DOCUMENTS

| | | | |
|---|---|---|---|
| 4,689,694 | 8/1987 | Yoshida | 358/298 |
| 4,731,673 | 3/1988 | Yamakawa | 358/300 |
| 4,801,978 | 1/1989 | Lama et al. | 355/69 |
| 4,926,200 | 5/1990 | Ohyama et al. | 346/160 |
| 4,952,951 | 8/1990 | Kumasaka et al. | 346/160 |

FOREIGN PATENT DOCUMENTS

| | | | |
|---|---|---|---|
| 0284788 | 12/1986 | Japan | 346/160 |
| 2-39171 | 2/1990 | Japan | 346/160 |

*Primary Examiner*—Benjamin R. Fuller
*Assistant Examiner*—David Yockey

[57] ABSTRACT

A printing system operating in a charged area development environmental utilizes a high resolution image print bar in cooperation with a low resolution image discharge bar to expose a charged surface of a photoreceptor with a minimum of stress being applied to the high resolution bar. The high resolution bar is addressed from an image data source so as to expose areas of the photoreceptor which correspond to informational areas of the image being printed. The low resolution bar is addressed from the same data source so as to discharge the photoreceptor surface in non-informational areas such as background areas and interimage areas. In a preferred embodiment, both the high and the low resolution bars are LED arrays located in a common exposure station.

10 Claims, 1 Drawing Sheet

METHOD AND APPARATUS FOR CHARGED AREA DEVELOPMENT PRINTING WITH HIGH AND LOW RESOLUTION IMAGE BARS

BACKGROUND AND INFORMATION DISCLOSURE STATEMENT

This invention relates to an electronic printer which uses an addressable image writing array (write bar) to form images on a moving photoreceptor surface. More particularly, the invention is directed to a print system utilizing a first image bar for high resolution printing in cooperation with a second image bar for low resolution exposure.

Prior art printing systems which utilize linear image bars, composed of a plurality of, for example, individually activated lightemitting diodes (LEDs) are known in the art. The images are formed on a photoreceptive surface by selectively energizing each LED in response to input binary digital image signals. Representative print systems are disclosed, for example, in U.S. Pat. Nos. 4,801,978; 4,689,694; and 4,731,673.

The image bar printer creates an image-wise discharge of a charged photoreceptive surface in one of two operational modes. The first is characterized as a discharge area development, sometimes known as a "write black" mode in which the individual LEDs are activated (turned on) to discharge (expose) a portion of the photoreceptive surface corresponding to black (informational) areas of the image being printed. The complete latent image thus consists of discharged areas, corresponding to the image, and undischarged areas corresponding to (usually white) background. The subsequent conventional prior art step of development is adapted to attract toner to the discharged areas to form a developed image suitable for transfer to a recording medium.

The second operational mode is a charged area development, sometimes known as a "write white" mode in which individual LEDs are activated to expose the background, leaving the informational (image) areas in the charged state. The subsequent development step is thus adapted to attract toner to the still charged areas to form the developed image.

Documents to be printed have, on average, about 7-10% text area coverage. Thus, an LED image bar operated in a charged area development write white mode has a considerably higher duty cycle than an image bar operated in the discharged area development write black mode; e.g., the write white bar will be "on" 90% of the time while the write black bar will only be "on" 10% of the time. This higher duty cycle shortens the life of the write white bar. In addition to the problem of shorter life, the write white bar requires higher maximum current and generates more heat, which may require some form of cooling. Thus, a write black system would appear to be the preferred system for most, but not all, conventional LED image bar printers. However, there are additional considerations involving certain trade-offs which might make the use of a write white system attractive. One factor is a requirement that a particular printing system be compatible with an already existing light lens copying system. Virtually all light lens conventional copiers direct light reflected from a scanned original (light lens) to the photoreceptive surface. The discharged areas are then the background areas and the charged areas represent the information areas. In other words, the conventional light lens copier operates in a write white mode. The photoreceptor and development system are selected to be compatible with operation in this mode. If it is desired to add a high resolution LED image bar, to a light lens copier to enable both copier and printer functions, or if it is desired to enable a printer using a light lens xerographic engine as the base engine, the image bar will have to operate in the write white mode.

According to a first aspect of the present invention, the prior art write white system is modified by including a second, low resolution image bar whose function is to discharge areas of the photoreceptor corresponding to selected, non-informational background areas of the image. This greatly reduces the use rate of the higher resolution bar which will only be used to expose the informational areas. Thus, the life of the high resolution image bar is extended. Significant cost saving are achieved by less frequent replacement of the more expensive high resolution bar. The low resolution bar is much less expensive than the high resolution bar and, due to higher operating tolerances, has an operating life which is greater than the life of the high resolution bar. According to a second aspect of the invention, the low resolution print bar can also be used to provide other functions such as inter-document erase, and, patch generation for diagnostic test purposes.

It is known to use multiple LED image bars in the printing system, but in a different configuration, and for different purposes. U.S. Pat. No. 4,926,200 discloses a printer having two LED image bars of different resolutions, one for text and a second bar for pictorials. Thus, both LED image bars are simultaneously energized for printing information, albeit of different resolutions.

More particularly, the present invention relates to an image bar printing apparatus for exposing the surface of a photosensitive medium, including in combination a first, high resolution image bar, a second, low resolution image bar, and input data control means for selectively energizing said first and second bars so as to expose a first selected area of said photosensitive medium with said first image bar, and to expose a second selected background area of said photosensitive medium with said second image bar.

DESCRIPTION OF THE INVENTION

Figure 1:
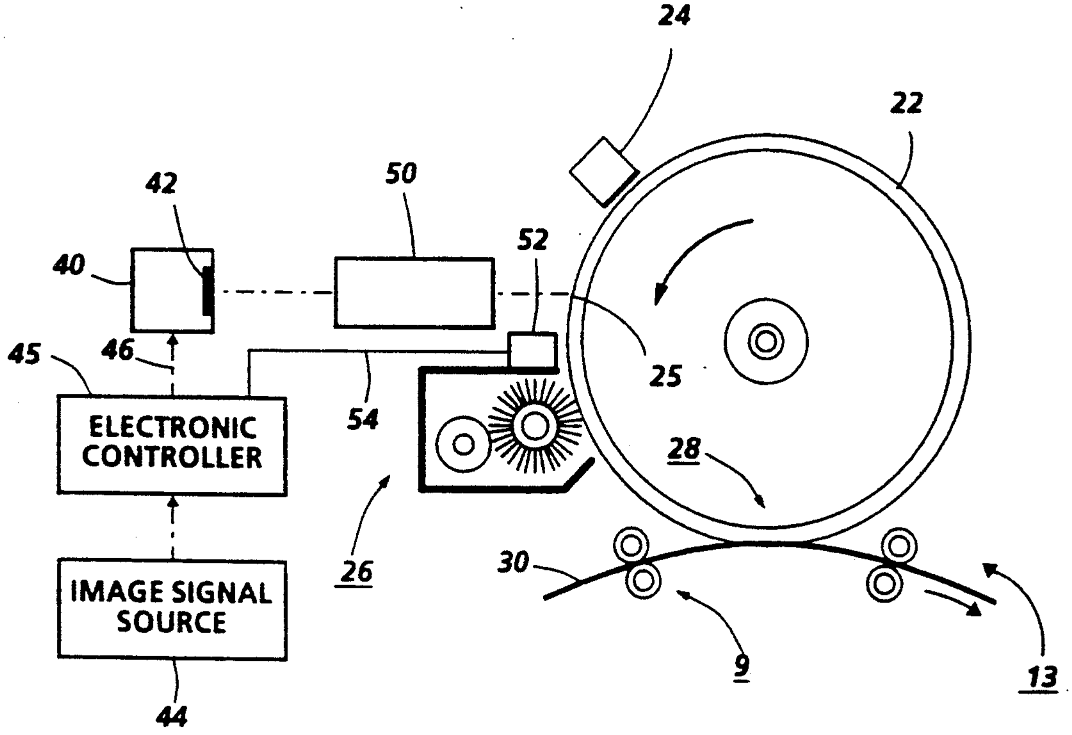
FIG. 1 is an end view of a printing system utilizing the high and low resolution image bars of the present invention.

FIG. 1 shows a printer which utilizes a full width, LED type high resolution image bar and a full width LED type low resolution image bar according to the principles of the present invention. The invention may be used in other types of imaging system employing, for example, LCD (liquid crystal displays) or electro-optic displays as the image bars.

As shown in FIG. 1, exemplary printer 9 includes a xerographic system in which a photosensitive medium such as a photoreceptor drum 22 is supported for rotation in a suitable housing or enclosure. A suitable motor (not shown) rotates drum 22 in the direction shown by the solid line arrow upon actuation of copier 9. A corona charging device such as corotron 24 is disposed in operative relationship with drum 22, corotron 24 serving to place a uniform electrostatic charge on photoconductive drum 22 preparatory to exposure thereof.

Photoconductive drum 22 is exposed at an exposure station 25 downstream of corotron 24 in a manner to be more fully described herein below, such exposure creating a latent electrostatic image on the surface of photoconductive drum 22. Following exposure, the latent electrostatic image on photoconductive drum 22 is developed at development station 26 and the developed image is transferred at transfer station 28 to a suitable copy substrate material shown here as a sheet 30 of copy paper brought forward in timed relation to arrival of the developed image. The copy sheet 30 bearing the developed image, is carried to a suitable fusing or fixing device (not shown) where the toner image is permanently adhered to the copy sheet 30. A final cleaning step may be performed to remove toner from the drum surface prior to recharging. A high resolution image bar 40, comprising a plurality of light emitting diodes (LEDs) 42 is provided. Bar 40 may have a resolution range of between 300–600 spi. LEDs 42 are disposed in one or more linear arrays or rows. Image signals from an image signal source 44 are input to an electronic controller 45 which generates suitable output data signals to bar 40 via input line 46. Source 44 can be a data communication channel, raster input scanner or the like. Image bar 40 incorporates suitable circuitry including a pixel clock to selectively activate LEDs 42 (control on-off time) in response to the image input signal. The image rays from image bar 40 are coupled into a lens array 50 which preferably comprises a plurality of gradient index lens optical fibers arranged in one or more linear rows. Lens array 50 transmits a focused line of pixel images onto the surface of drum 20 at the exposure station.

According to the present invention, a second low resolution image bar 52 is positioned adjacent to the photoreceptor surface. Bar 52 may have a resolution range of 10–100 spi. Image bar 52 also extends linearly along the length of the drum surface, and is fully addressable by output signals from controller 45 along a second input line 54. Controller 45 is adapted to examine the digital image data input from source 44, and to separate the data into two binary streams, one associated with the high resolution information data, and the other with a low resolution background data.

Figure 2:
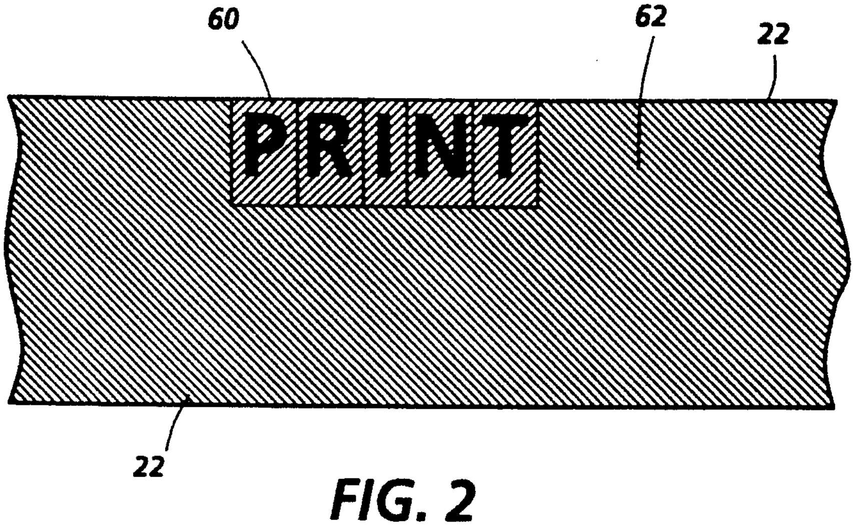
FIG. 2 shows a portion of the surface of a photoreceptor with one area designated as a high resolution print area, and a second area as a low resolution discharge area.

To illustrate this dual LED bar input, FIG. 2 shows a portion of the photoreceptor surface 22. A high resolution scan area 60 is shown as a rectangle surrounding the informational word PRINT. The parameters associated with scan area 60 will be recognized by the image signal source circuitry, and image bar 40 will be addressed so as to expose area 60 at the higher resolution. The area surrounding area 60, designated as a low density discharge area 62 is to be discharged by bar 52. Therefore, the signal sent along line 54 will selectively address the low resolution bar 52 causing individual LEDs to turn on to discharge discrete background areas within area 62, but to remain off when over the area bounded by area 60. Thus, image bar 40 is selectively activated only when high resolution exposure of informational areas is required, while low resolution bar 52 is selectively energized to discharge the non-informational areas. The net result is that bar 40 operates under reduced stress and heat conditions, and has a longer life.

According to a second aspect of the invention, low resolution bar 52 can be used for additional erase-type functions in a xerographic system. For example, it can be selectively addressed to erase areas between successively formed image (inter-document) areas, or to erase edges of an image to accommodate changes in magnification.

According to a still further aspect to of the invention, bar 52 can be used in an editing mode to delete previously exposed informational areas, or to add real time low resolution image data such as time or date, or an authorization number.

According to another aspect of the invention, the low resolution image bar can be used in a diagnostic mode as a patch generator to create an exposure pattern on surface 22 which can be subsequently measured by an electrometer to assist in optimizing system parameters.

For all of the above usages of bar 52, it is understood that the operational tolerances on this bar are greatly relaxed when compared to the much tighter tolerances required to operate image bar 40. Therefore, the operational life of both image bars, when used in the combination according to the present invention, are both higher with the typical life of bar 52 at perhaps 1–2 times the life of bar 40.

While the image bar and the embodiment disclosed above utilized LED arrays, other selectively addressable image bars may be used such as those incorporating liquid crystal elements (LCDs) or PLZT arrays. And while the low resolution bar 52 was shown exposing the photoreceptor without a focusing SELFOC type lens, it may be preferable for other system applications to include such a lens and low quality, low cost plastic lenses are appropriate for this usage.

While the invention has been described with reference to the particular system disclosed, it is not confined to the details set forth, but is intended to cover such modifications or changes as may come within the scope of the following claims:

We claim:

1. An image bar printing apparatus for exposing a photosensitive medium having a previously charged surface, including in combination a high resolution image bar, a low resolution image bar, and input data control means for selectively energizing said image bars so that said high resolution image bar generates a light output representative of image information and discharges the areas of the photosensitive medium corresponding to said image information and said low resolution image bar discharges a second selected non-informational background area of said photosensitive medium.

2. The apparatus of claim 1 wherein said low resolution image bar generates a light output which discharges non-informational areas of the phototsensitive medium not exposed by the high resolution image bar.

3. The apparatus of claim 2 wherein said low resolution image bar discharges areas of the photosensitive medium which separate sucessively formed image areas.

4. The apparatus of claim 1 wherein the image bars are LED arrays.

5. The apparatus of claim 1 further including a lens array coupled with said high resolution image bar to form said discharged areas which correspond to said image information.

6. The apparatus of claim 1 wherein said low resolution image bar is an addressable liquid crystal display (LCD) array.

7. The apparatus of claim 1 wherein said low resolution image bar has a resolution of between 10–100 spots per inch (spi) and said high resolution image bar has a resolution greater than 200 spi.

8. An image bar printing apparatus including:

a high resolution image write bar and a low resolution image discharge bar, both bars positioned in an exposure station, a photosensitive medium, means for charging said photosensitive medium prior to entering said exposure station, and image signal source means connected to said high resolution and low resolution bars, for generating data streams, wherein one of said streams comprises an informational image data stream which selectively addresses said high resolution image write bar causing said write bar to expose said photosensitive medium over selected informational areas, and another of said streams comprise a background data stream which selectively energizes said discharge bar causing said discharge bar to discharge said photosensitive medium in non-informational background areas.

9. A method for forming a latent image on a photoreceptor having a top surface including the steps of:

charging the surface of said photoreceptor, exposing selected informational areas of said photoreceptor surface by use of a high resolution image print bar, and erasing selected non-informational areas of said surface by means of a low resolution image discharge bar.

10. An image bar printing apparatus for exposing a photosensitive medium, including, in combination, a high resolution image bar, a low resolution image bar, and input data control means for selectively energizing said high resolution and low resolution bars, said high resolution bar generating a light output representative of image information which exposes areas of a photosensitive medium corresponding to said image information and wherein said low resolution image bar generates a light output to expose selected non-informational background areas of said photosensitive medium.

* * * * *